United States Patent
Ma et al.

(10) Patent No.: US 12,445,838 B2
(45) Date of Patent: Oct. 14, 2025

(54) 5G AUTHENTICATION METHOD, 5G ACCOUNT OPENING METHOD AND SYSTEM, AND ELECTRONIC DEVICE AND COMPUTER-READABLE STORAGE MEDIUM

(71) Applicant: ZTE Corporation, Guangdong (CN)

(72) Inventors: Hongli Ma, Guangdong (CN); Jianhua Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 365 days.

(21) Appl. No.: 18/013,239

(22) PCT Filed: Jun. 24, 2021

(86) PCT No.: PCT/CN2021/102146
§ 371 (c)(1),
(2) Date: Dec. 27, 2022

(87) PCT Pub. No.: WO2022/001832
PCT Pub. Date: Jan. 6, 2022

(65) Prior Publication Data
US 2023/0300612 A1 Sep. 21, 2023

(30) Foreign Application Priority Data
Jun. 28, 2020 (CN) .......................... 202010598962.7

(51) Int. Cl.
*H04W 12/06* (2021.01)
*H04W 8/00* (2009.01)

(52) U.S. Cl.
CPC .......... *H04W 12/06* (2013.01); *H04W 8/005* (2013.01)

(58) Field of Classification Search
CPC .............................. H04W 12/06; H04W 8/005
(Continued)

(56) References Cited

U.S. PATENT DOCUMENTS 8,850,545 B2 * 9/2014 Cha ...................... G06F 21/335
                                                              726/8
10,750,350 B1 * 8/2020 Gundavelli ............. H04W 8/26
(Continued)

FOREIGN PATENT DOCUMENTS

CN 109041057 A 12/2018
CN 109756896 A * 5/2019
(Continued)

OTHER PUBLICATIONS

Chinese office action issued in CN Patent Application No. 202010598962.7, dated Jul. 30, 2024, 14 pages. English translation included.
(Continued)

*Primary Examiner* — Kambiz Zand
*Assistant Examiner* — Mahabub S Ahmed
(74) *Attorney, Agent, or Firm* — Perkins Coie LLP (57) ABSTRACT

Related to is the technical field of mobile communication, and discloses a 5th Generation (5G) authentication method, a 5G account opening method and system, an electronic device, and a computer-readable storage medium. The 5G authentication method comprises: determining whether there is authentication data in local based on an authentication vector acquisition request transmitted by an authentication network element (AUSF); in response to there being no authentication data in local, acquiring an authentication vector from a home subscription server (HSS) according to the authentication vector acquisition request; and generating a home authentication vector according to the authentication vector, and transmitting the home authentication vector to the AUSF, to enable the AUSF performs authentication verification according to the home authentication vector.

20 Claims, 3 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 10,873,464 | B2* | 12/2020 | Muhanna | H04L 9/14 |
| 10,887,754 | B2* | 1/2021 | Gamishev | H04W 8/04 |
| 11,012,857 | B1* | 5/2021 | Malhotra | H04W 8/08 |
| 11,792,172 | B2* | 10/2023 | Nair | H04W 12/069 |
| | | | | 726/7 |
| 2005/0010612 | A1* | 1/2005 | Enderwick | H04L 45/7453 |
| 2012/0311330 | A1* | 12/2012 | Zhang | H04W 12/069 |
| | | | | 713/168 |
| 2013/0012168 | A1* | 1/2013 | Rajadurai | H04W 12/04 |
| | | | | 455/411 |
| 2014/0196127 | A1* | 7/2014 | Smeets | H04L 63/0884 |
| | | | | 726/5 |
| 2017/0063859 | A1* | 3/2017 | Shue | H04L 63/10 |
| 2017/0099188 | A1* | 4/2017 | Chang | H04L 67/10 |
| 2018/0013568 | A1* | 1/2018 | Muhanna | H04W 12/06 |
| 2018/0184297 | A1* | 6/2018 | Mohamed | H04W 12/08 |
| 2018/0324585 | A1* | 11/2018 | Nair | H04L 63/0876 |
| 2019/0149990 | A1* | 5/2019 | Wang | H04W 12/0471 |
| | | | | 370/329 |
| 2019/0159014 | A1* | 5/2019 | Gamishev | H04W 8/04 |
| 2019/0261180 | A1* | 8/2019 | Lei | H04W 8/04 |
| 2019/0297083 | A1* | 9/2019 | Li | H04L 63/08 |
| 2020/0053545 | A1* | 2/2020 | Wong | H04W 76/27 |
| 2020/0053582 | A1* | 2/2020 | Zhu | H04W 36/0033 |
| 2020/0068397 | A1* | 2/2020 | Kang | H04W 88/18 |
| 2020/0092720 | A1 | 3/2020 | Chin et al. | |
| 2020/0100105 | A1* | 3/2020 | Wang | H04W 12/086 |
| 2020/0213858 | A1* | 7/2020 | Yi | H04W 8/26 |
| 2020/0221297 | A1* | 7/2020 | Hu | H04W 12/041 |
| 2020/0351650 | A1* | 11/2020 | Maria | G06F 9/45558 |
| 2021/0006549 | A1* | 1/2021 | Mufti | H04L 63/08 |
| 2021/0092104 | A1* | 3/2021 | Avetoom | H04L 69/40 |
| 2021/0165885 | A1* | 6/2021 | Zhang | H04L 9/3213 |
| 2021/0185523 | A1* | 6/2021 | Targali | H04W 12/0471 |
| 2021/0219126 | A1* | 7/2021 | Mahajan | H04W 8/183 |
| 2021/0306855 | A1* | 9/2021 | You | G06F 21/575 |
| 2021/0337374 | A1* | 10/2021 | Sihotang | H04W 8/186 |
| 2022/0030428 | A1* | 1/2022 | Li | H04W 12/69 |
| 2022/0060897 | A1* | 2/2022 | Bartolomé Rodrigo | H04W 60/00 |
| 2022/0078692 | A1* | 3/2022 | Stojanovski | H04W 60/00 |
| 2022/0201638 | A1* | 6/2022 | Arrobo Vidal | H04W 48/08 |
| 2022/0201639 | A1* | 6/2022 | Abtin | H04L 65/1104 |
| 2022/0247678 | A1* | 8/2022 | Atwal | H04B 7/195 |
| 2022/0255734 | A1* | 8/2022 | Zhang | H04W 12/069 |
| 2022/0264445 | A1* | 8/2022 | Sakai | H04W 60/00 |
| 2023/0027975 | A1* | 1/2023 | Liu | H04L 25/03993 |
| 2023/0054184 | A1* | 2/2023 | Loehr | H04W 74/0808 |
| 2023/0262463 | A1* | 8/2023 | Kunz | H04L 63/1475 |
| | | | | 455/410 |
| 2023/0269589 | A1* | 8/2023 | Baskaran | H04W 12/037 |
| | | | | 726/6 |
| 2023/0336313 | A1* | 10/2023 | Loehr | H04W 28/10 |

FOREIGN PATENT DOCUMENTS

| | | | | |
|---|---|---|---|---|
| CN | 110536279 | A | | 12/2019 |
| CN | 110891271 | A | | 3/2020 |
| CN | 111246478 | A | | 6/2020 |
| CN | 111314899 | A | | 6/2020 |
| CN | 111757311 | B | * 10/2021 | ............ H04W 12/06 |
| TW | 201246890 | A | * 11/2012 | ............ H04L 9/0819 |

OTHER PUBLICATIONS

International Search Report and Written Opinion for International Application No. PCT/CN2021/102146, mailed on Sep. 15, 2021. 8 pages with translation.

Huawei et al., "Removal of the number of AVs requested in Authentication Information Request message," 3GPP TSG SA WG3 (Security) Meeting #90, S3-180126, revision of S3-17xabc, Jan. 22-26, 2018, Gothenburg, Sweden, 5 pages.

European Search Report issued in EP Patent Application No. 21831770.9, dated Nov. 10, 2023, 8 pages.

3GPP TS 23.632, V0.5.0, (Oct. 2019), Technical Specification, 3rd Generation Partnership Project; Technical Specification Group Core Network and Terminals; User Data Interworking, Coexistence and Migration; Stage 2; (Release 16), 32 pages.

Japanese office action issued in JP Patent Application No. 2022-581453, dated Jan. 16, 2024, 6 pages. English translation included.

* cited by examiner

5G AUTHENTICATION METHOD, 5G ACCOUNT OPENING METHOD AND SYSTEM, AND ELECTRONIC DEVICE AND COMPUTER-READABLE STORAGE MEDIUM

CROSS-REFERENCE TO RELATED APPLICATIONS

The present application is a U.S. National Stage Application of PCT Application Serial No. PCT/CN2021/102146, filed Jun. 24, 2021, which claims priority to a Chinese patent application with application No. 202010598962.7 filed with the China Patent Office on Jun. 28, 2020, the entire contents of each of which are incorporated herein by reference in their entireties.

FIELD

The present application relates to the technical field of mobile communication.

BACKGROUND

With the development of wireless communication technology, wireless network consists of 2G (2-Generation Wireless Telephone Technology), 3G (3rd-Generation Mobile Communication Technology), 4G (4th Generation Mobile Communication Technology) is evolving to 5G (5th Generation Mobile Communication Technology). Since the existing user data is saved by HSS (Home Subscriber Server), and user data in the 5G network is saved by UDM (Unified Data Management). Therefore, when 5G services are activated, the user's authentication data needs to be migrated from the HSS to the UDM, and the 5G subscription is completed.

SUMMARY

The first aspect of the embodiments of the present application provides a 5G authentication method, including: determining whether there is authentication data in local, based on an authentication vector acquisition request transmitted by AUSF (Authentication Server Function, authentication network element); in response to there being no authentication data in local, acquiring an authentication vector from a home subscription server HSS according to the authentication vector acquisition request; and generating a home authentication vector according to the authentication vector, and transmitting the home authentication vector to the AUSF, to enable the AUSF perform authentication verification according to the home authentication vector.

The second aspect of the embodiments of the present application provides a 5G account opening method, including: performing authentication verification on a UE (User Equipment, terminal) according to the above-mentioned 5G authentication method, based on a registration request transmitted by the UE; and in response to authentication verification being successful, transmitting an account opening command to an account opening system to enable the account opening system to perform data migration and 5G registration account opening of the UE based on the account opening command.

The third aspect of the embodiments of the present application provides an electronic device, including a memory and a processor; the memory is configured to store a computer program; the processor is configured to execute the computer program and implement at least one operation of the above-mentioned 5G authentication method when executing the computer program.

The fourth aspect of the embodiments of the present application provides a 5G account opening system, including a UE, a UDM, and an account opening system. The UE is configured to send a registration request; the UDM is configured to receive the registration request transmitted by the UE and perform at least one operation of the above-mentioned 5G account opening method; and, the account opening system is configured to perform data migration and 5G registration account opening of the UE according to the account opening command transmitted by the UDM.

The fifth aspect of the embodiments of the present application provides a computer-readable storage medium, on which a computer program is stored, and when the computer program is executed by a processor, cause the processor to implement at least one operation of the above-mentioned 5G authentication method or 5G account opening method.

DETAILED DESCRIPTION OF EMBODIMENTS

The following will clearly and completely describe the technical solutions in the embodiments of the present application with reference to the drawings in the embodiments of the present application. Obviously, the described embodiments are part of the embodiments of the present application, not all of them. Based on the embodiments in the present application, all other embodiments obtained by persons of ordinary skill in the art without making creative efforts belong to the protection scope of the present application.

The flow charts shown in the drawings are just example illustrations, and do not necessarily include all contents and operations/steps, nor must they be performed in the order described. For example, some operations/steps can be decomposed, combined or partly merged, so the actual order of execution may be changed according to the actual situation.

It should be understood that the terms herein used in the specification of the present application are just for the purpose of describing specific embodiments and are not intended to limit the present application. As used in the specification of the present application and the appended claims, the singular forms "a", "an" and "the" are intended to include plural referents unless the context clearly dictates otherwise.

It should also be understood that the term "and/or" used in the specification of the present application and the appended claims refers to any combination and all possible combinations of one or more of the associated listed items, and includes these combinations.

The relevant authentication process needs to preset the authentication data of the HSS users in UDM for authentication verification, however, due to the large amount of users and data, the construction period of UDM is too long and difficult. In order to quickly develop 5G services, how to automatically complete the authentication and verification to activate 5G services after the user inserts the card into the UE that supports 5G SA, reduce the difficulty of UDM construction and the length of the construction period, and improve the convenience of 5G service account opening has become an urgent need solved problem.

In view of this, the embodiments of the present application provide a 5G authentication method, a 5G account opening method, electronic device, a 5G account opening system, and a computer-readable storage medium. The 5G authentication method can perform authentication verification on 5G UE without pre-stored authentication data in UDM, reducing the difficulty and period of UDM construction.

Figure 1:
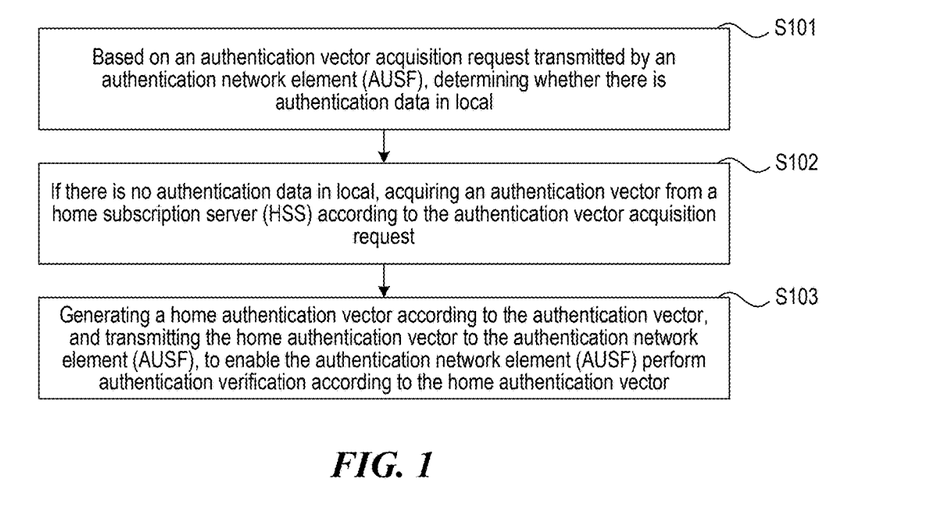
FIG. 1 is a schematic flowchart of a 5G authentication method provided by an embodiment of the present application.

FIG. 1 is a schematic flowchart of a 5G authentication method provided by an embodiment of the present application. The 5G authentication method authenticates the UE by obtaining authentication data from the HSS, thereby reducing the difficulty and period of UDM construction.

As shown in FIG. 1, the 5G authentication method specifically includes operations S101 to S103.

In operation S101, based on the authentication vector acquisition request transmitted by the AUSF, it is determined whether there is authentication data in local.

AUSF is a network element with the function of authentication server. After the UE that supports 5G is booted, it automatically initiates a registration request to the 5G network. After receiving the registration request transmitted by the UE, the AMF (Access and Mobility Management Function) sends an authentication vector acquisition request to the AUSF, so as to perform authentication verification on the UE. UE booting may refer to inserting a phone card into the 5G UE.

The AUSF sends an authentication vector acquisition request to the UDM, and the UDM determines whether there is UE authentication data in local according to the authentication vector acquisition request.

In one possible implementation, the authentication request includes the terminal identifier, and the UDM determines whether there is authentication data corresponding to the terminal identifier in local according to the terminal identifier. If there is authentication data corresponding to the terminal identifier in local, it is considered that the UE has completed 5G authentication and there is no need to obtain authentication data from the HSS. If there is no authentication data corresponding to the terminal identifier in local, it is considered that the UE has not yet performed 5G authentication, and the authentication data needs to be obtained from the HSS for authentication verification, so as to perform a 5G account opening for the UE after the authentication verification is passed.

In operation S102, if there is no authentication data in local, the authentication vector is acquired from the HSS according to the authentication vector acquisition request.

If the UDM determines that there is no authentication data in local, the UDM acquires the authentication vector from the HSS according to the authentication vector acquisition request.

In one possible implementation, the authentication vector acquisition request includes a terminal identifier; obtaining the authentication vector from the HSS according to the authentication vector acquisition request includes: obtaining an authentication vector corresponding to the terminal identifier from the HSS according to the terminal identifier.

The authentication vector is acquired from the HSS according to the terminal identifier, and it is ensured that the acquired authentication vector corresponds to the UE that initiates the registration request. The authentication vectors include RAND, AUTN, XRES, CK and IK. RAND is a random number provided to the UE; AUTN is an authentication token provided to the UE so that the UE can authenticate the 5G network according to the AUTN; XRES is the expected UE authentication response parameter to determine whether the authentication is successful; CK is an encryption key; and, IK is an integrity key.

In operation S103, a home authentication vector is generated according to the authentication vector, and the home authentication vector is sent to the AUSF, so that the AUSF performs authentication verification according to the home authentication vector.

The UDM calculates the authentication vector to obtain a home authentication vector, and the UDM sends the generated home authentication vector to the AUSF, so that the AUSF performs authentication verification according to the home authentication vector.

In one possible implementation, generating the home authentication vector according to the authentication vector includes: calculating the authentication vector according to a preset authentication algorithm to obtain the home authentication vector.

The attribution authentication vector is 5G HE AVs, including RAND, AUTN, XRES* and Kausf. When calculating the authentication vector according to the preset authentication algorithm, it can be calculated according to the calculation method in the 5G standard. Specifically, Kausf can be derived according to TS33.501 Annex A.2, XRES* can be derived according to TS33.501 Annex A.4, and finally the home authentication vector 5G HE AVs can be created.

After obtaining the home authentication vector 5G HE AVs, the UDM sends the home authentication vector 5G HE AVs to the AUSF, and the AUSF performs authentication verification according to the home authentication vector 5G HE AVs.

When the AUSF performs authentication verification according to the home authentication vector 5G HE AVs, the AUSF can save the XRES* in the home authentication vector 5G HE AVs, and calculate and derive based on the home authentication vector 5G HE AVs according to the 5G standard, so as to obtain the network element authentication vector 5G SE AV, and then send the obtained network element authentication vector 5G SE AV to the AMF. The network element authentication vector 5G SE AV includes RAND, AUTN, and HXRES*. Specifically, HXRES* can be derived from XRES* according to TS33.501 Annex A.5, and XRES* of the home authentication vector 5G HE AVs can be replaced by the derived HXRES*, so as to obtain the network element authentication vector 5G SE AV.

After the AMF receives the network element authentication vector 5G SE AV, the security anchor point (SEAF) of the AMF initiates an authentication process to the UE through a non-access stratum (NAS) message, and carries the RAND authentication parameter and AUTN authentication parameters in the authentication vector.

The USIM (Universal Subscriber Identity Module) in the UE calculates XMAC according to the received RAND, and compares the calculated XMAC with the MAC value in AUTN. If MAC=XMAC, the verification is passed, and after the verification is passed, verify whether the serial number (SQN) in the AUTN is valid. If the SQN verification is successful, the USIM calculates the response (RES) and returns the RES to the ME. The ME calculates the RES* according to the RES and sends the calculated RES* to SEAF of AMF. Specifically, when verifying whether the MAC and XMAC are equal, the verification may be performed according to the description of TS 33.102, and the ME derives the RES* from the RES according to TS33.501 Annex A.4.

SEAF calculates HRES* according to the calculated RES*, and compares whether HRES* and HXRES* are the same. If the two are consistent, it considers that the authentication is successful, and sends RES* and UE's terminal identifier to AUSF together for authentication confirmation.

AUSF compares whether the received RES* is consistent with the stored XRES*. If they are consistent, AUSF considers that the authentication verification has passed, and sends the verification result to SEAF to complete the authentication.

In one possible implementation, the 5G authentication method may further include: when the AUSF fails to perform authentication verification according to the home authentication vector, receiving a resynchronization request transmitted by the AUSF to perform resynchronization.

When the AUSF fails to perform authentication verification according to the home authentication vector, it may initiate a resynchronization request, so as to perform authentication verification again according to the resynchronization request.

In one possible implementation, receiving the resynchronization request transmitted by the AUSF to perform resynchronization includes: determining whether there is authentication data in local based on the resynchronization request transmitted by the AUSF; if there is no authentication data in local, obtaining an authentication vector from the HSS according to the resynchronization request; generating a home authentication vector according to the authentication vector, and transmitting the home authentication vector to the AUSF, to enable the AUSF perform authentication verification according to the home authentication vector.

When AUSF fails to perform authentication verification according to the home authentication vector, UE returns authentication failure information, and AMF initiates a resynchronization request to AUSF according to the authentication failure information returned by UE. After receiving the resynchronization request transmitted by the AMF, the AUSF sends a resynchronization request to the UDM, so that the UDM can re-determine whether there is authentication data in local based on the resynchronization request, and obtain the authentication vector from the HSS according to the resynchronization request when there is no authentication data in local.

After receiving the authentication vector, the UDM can generate a home authentication vector according to the authentication vector, and send the home authentication vector to the AUSF, so that the AUSF performs authentication verification according to the home authentication vector. The process of authentication verification performed by the AUSF according to the home authentication vector is similar to the foregoing process, and will not be repeated here.

Figure 2:
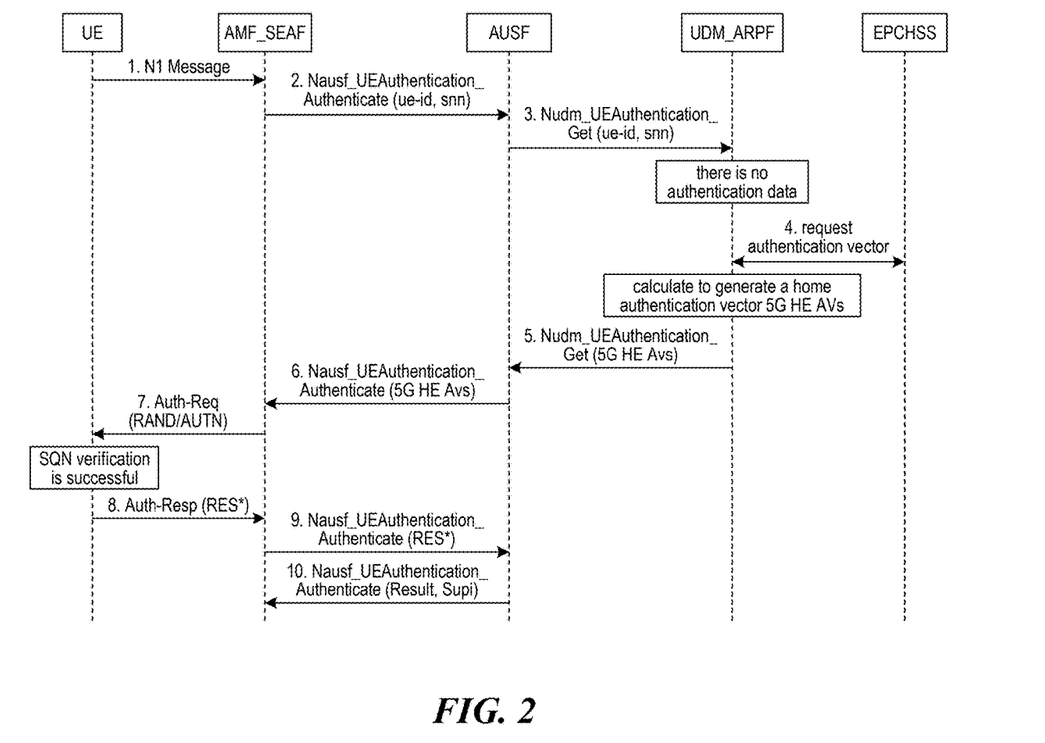
FIG. 2 is an interactive schematic diagram of the 5G authentication method provided by an embodiment of the present application.

FIG. 2 is an interactive schematic diagram of the 5G authentication method provided by an embodiment of the present application. As shown in FIG. 2, the interaction process of the 5G authentication method may specifically include the following operation 1)-operation 10).

In operation 1), after the UE supporting 5G is booted, it automatically initiates a registration request to the 5G network.

In operation 2), the AMF initiates an authentication request to the AUSF according to the registration request initiated by the UE, and the authentication request includes the terminal identifier.

In operation 3), the AUSF requests the UDM to obtain an authentication vector based on the authentication request.

In operation 4), the UDM determines that there is no authentication data corresponding to the UE in local according to the request transmitted by the AUSF, and obtains the authentication vector from the HSS.

In operation 5), the HSS sends the authentication vector corresponding to the UE to the UDM, and then the UDM calculates the authentication vector to obtain the home authentication vector 5G HE AVs, and sends the generated home authentication vector 5G HE AVs to the AUSF.

In operation 6), the AUSF obtains the network element authentication vector 5G SE AV based on the home authentication vector 5G HE AVs, and sends the obtained network element authentication vector 5G SE AV to the AMF. The AUSF shall save the XRES* in the home authentication vector 5G HE AVs.

In operation 7), after the AMF receives the network element authentication vector 5G SE AV, the SEAF initiates an authentication process to the UE through a NAS message, and carries the RAND authentication parameter and the AUTN authentication parameter in the authentication vector.

In operation 8), the UE verifies the SQN successfully according to the received RAND and AUTN, then calculates RES*, and sends the calculated RES* to SEAF of the AMF.

In operation 9), The SEAF calculates HRES* according to the calculated RES*, compares HRES* with HXRES* to be consistent, considers that the authentication is successful, and sends RES* and UE's terminal identifier to the AUSF together.

In operation 10), the AUSF compares the received RES* with the saved XRES* to be consistent, confirms that the authentication verification is passed, and sends the verification result to SEAF.

Figure 3:
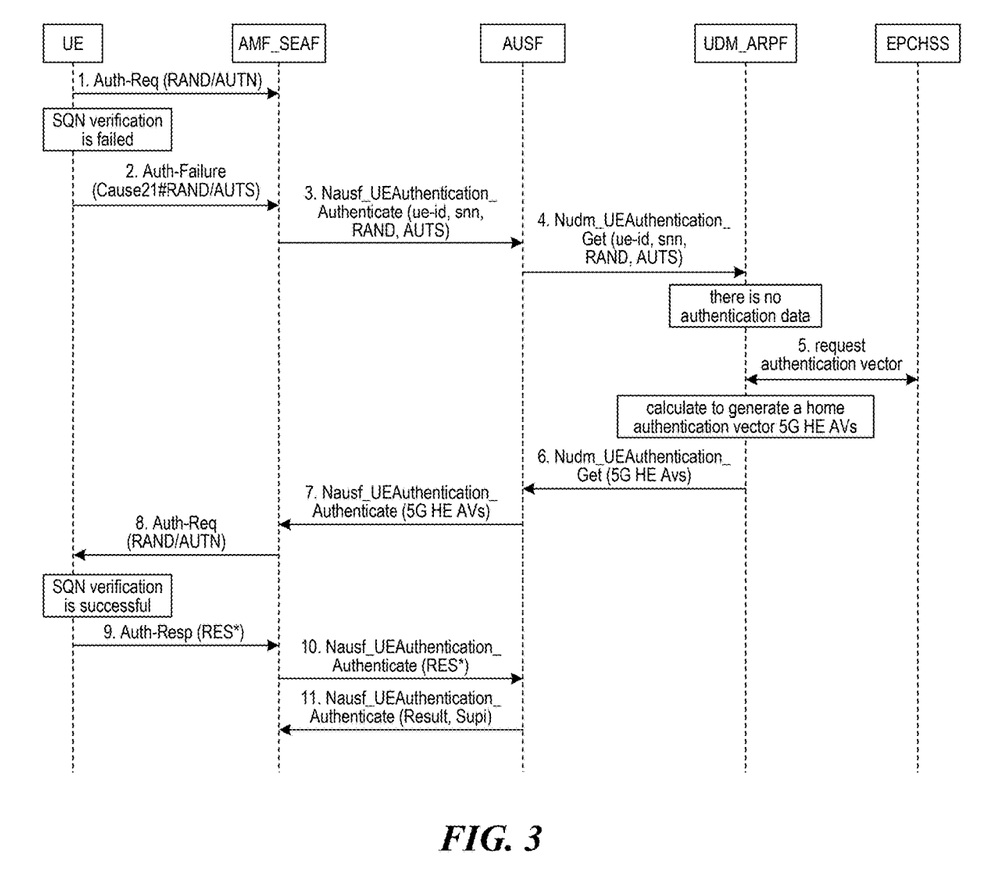
FIG. 3 is an interactive schematic diagram of resynchronization in the 5G authentication method provided by an embodiment of the present application.

FIG. 3 is an interactive schematic diagram of resynchronization in the 5G authentication method provided by an embodiment of the present application. As shown in FIG. 3, the interactive process of resynchronization in the 5G authentication method may specifically include the following operation 1)-operation 11).

In operation 1), after the AMF receives the network element authentication vector 5G SE AV, the SEAF initiates an authentication process to the UE through a NAS message, and carries the RAND authentication parameter and the AUTN authentication parameter in the authentication vector.

In operation 2), the UE fails to verify the SQN according to the received RAND and AUTN, and returns an authentication failure message to the AMF, which includes the RAND authentication parameter and the AUTN authentication parameter in the received authentication vector.

In operation 3), after receiving the authentication failure message transmitted by the UE, the AMF sends a resynchronization request to the AUSF, and the resynchronization request includes the terminal identifier, RAND authentication parameters and AUTN authentication parameters.

In operation 4), the AUSF sends a resynchronization request to the UDM, and the resynchronization request includes the terminal identifier, the RAND authentication parameter and the AUTN authentication parameter.

In operation 5), the UDM determines that there is no authentication data corresponding to the UE in local according to the request transmitted by the AUSF, and obtains the authentication vector from the HSS.

In operation 6), the HSS sends the authentication vector corresponding to the UE to the UDM, and then the UDM calculates the authentication vector to obtain the home authentication vector 5G HE AVs, and sends the generated home authentication vector 5G HE AVs to the AUSF.

In operation 7), the AUSF obtains the network element authentication vector 5G SE AV based on the home authentication vector 5G HE AVs, and sends the obtained network element authentication vector 5G SE AV to the AMF. The AUSF shall save the XRES* in the home authentication vector 5G HE AVs.

In operation 8), after the AMF receives the network element authentication vector 5G SE AV, the SEAF initiates an authentication process to the UE through a NAS message, and carries the RAND authentication parameter and the AUTN authentication parameter in the authentication vector.

In operation 9), the UE verifies the SQN successfully according to the received RAND and AUTN, then calculates RES*, and sends the calculated RES* to SEAF of the AMF.

In operation 10), the SEAF calculates HRES* according to the calculated RES*, and compares HRES* with HXRES* to be consistent, considers that the authentication is successful, and sends RES* and UE's terminal identifier together to the AUSF.

In operation 11), the AUSF compares the received RES* with the stored XRES* to be consistent, confirms that the authentication verification is passed, and sends the verification result to the SEAF.

According to the 5G authentication method provided by the embodiment of the present application, based on the authentication vector acquisition request transmitted by AUSF, it is determined whether there is authentication data in local; if there is no authentication data in local, the authentication vector is acquired from the HSS according to the authentication vector acquisition request; a home authentication vector is generated according to the authentication vector, and the home authentication vector is sent to the AUSF, so that the AUSF performs authentication verification according to the home authentication vector. When performing 5G authentication verification on the UE, there is no need to preset the authentication data of the UE user in the UDM. When the UE user needs to perform 5G authentication on the UE user, the corresponding authentication vector can be acquired directly from the HSS and the authentication data can be saved in the UDM, thereby avoiding storing authentication data of users who have not yet used 5G UE in the UDM, reducing the amount of invalid storage data stored in the UDM, saving the UDM storage space, and reducing the construction period and difficulty of UDM.

Figure 4:
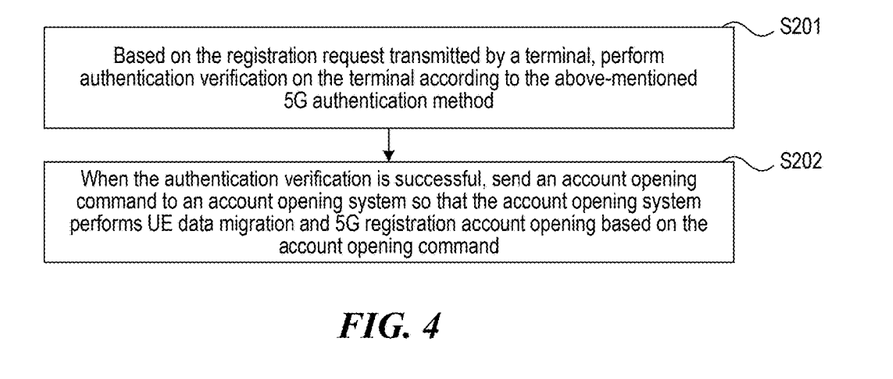
FIG. 4 is a schematic flowchart of a 5G account opening method provided by the embodiment of the present application.

FIG. 4 is a schematic flowchart of a 5G account opening method provided by an embodiment of the present application. The 5G account opening method can automatically open a 5G account for the UE after the UE is successfully authenticated, thereby improving the convenience of 5G account opening.

As shown in FIG. 4, the 5G account opening method specifically includes operation S201 and operation S202.

In operation S201, based on the registration request transmitted by the UE, authentication verification is performed on the UE according to the above-mentioned 5G authentication method.

The user uses a UE that supports 5G SA and inserts a phone card into the UE to control the UE to boot. After the UE is booted, it will automatically initiate a registration request to the 5G network. Based on the registration request transmitted by the UE, the UDM performs authentication verification on the UE according to the aforementioned 5G authentication method.

In operation S202, when the authentication verification is successful, an account opening command is sent to the account opening system so that the account opening system performs UE data migration and 5G registration account opening based on the account opening command.

When the UDM successfully authenticates the UE, the UDM can send an account opening command to the account opening system, thereby controlling the account opening system to perform UE data migration and 5G registration and account opening based on the account opening command.

In one possible implementation, the account opening system performs UE data migration and 5G registration account opening based on the account opening command, including: determining whether there is UE subscription data in local based on the data acquisition request transmitted by AMF; if there is no UE subscription data in local, then make the account opening system perform UE data migration and 5G registration account opening based on the account opening command.

After the authentication verification is successful, AMF can request UDM to acquire the subscription data of the UE. The subscription data includes the terminal identifier. UDM determines whether the UE's subscription data is saved in local according to the terminal identifier and the data acquisition request transmitted by the AMF. If it is determined that the subscription data of the UE is no saved in local, it is determined the user does not exist, and an account opening command is sent to the account opening system, so that the account opening system can automatically perform UE data migration and 5G registration account opening based on the account opening command.

Figure 5:
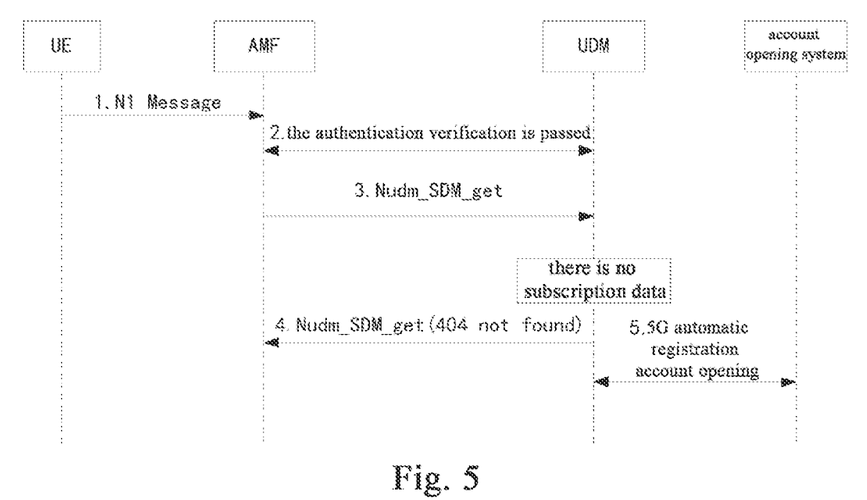
FIG. 5 is an interactive schematic diagram of the 5G account opening method provided by an embodiment of the present application.

FIG. 5 is an interactive schematic diagram of a 5G account opening method provided by an embodiment of the present application. As shown in FIG. 5, the interaction process of the 5G account opening method may specifically include the following operation 1)-operation 5).

In operation 1), the UE boots up and automatically initiates a registration request to the SA network, and the AMF receives the registration request from the UE.

In operation 2), the AMF initiates an authentication verification request to the UDM, requesting 5G authentication for the UE.

In operation 3), after the UDM successfully authenticates the UE, and the AMF acquires the subscription data of the UE from the UDM.

In operation 4), after the UDM detects that there is no subscription data of the user in local, it returns an error message to the AMF.

In operation 5), the UDM sends an account opening command to the account opening system, so that the account opening system completes 5G account opening according to the account opening command.

According to the 5G account opening method provided by an embodiment of the present application, based on the registration request transmitted by the UE, the UE is authenticated and verified according to the foregoing 5G authentication method. When the authentication and verification is successful, an account opening command is sent to the account opening system so that the account opening system performs UE data migration and 5G registration account opening based on the account opening command. Since the authentication data of the UE is directly acquired from the HSS during the authentication verification, there is no need to preset the authentication data in the UDM, which reduces the amount of invalid data stored in the UDM; after the authentication verification is passed, the 5G registration and account opening is performed automatically, which avoids the impact of invalid and illegal cards on the account opening system, and improves the convenience of the 5G registration and account opening.

Figure 6:
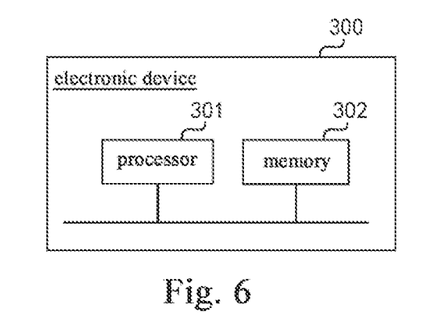
FIG. 6 is a schematic block diagram of an electronic device provided by an embodiment of the present application.

FIG. 6 is a schematic block diagram of an electronic device provided by an embodiment of the present application. The electronic device 300 may include a processor 301 and a memory 302, and the processor 301 and the memory 302 may be connected through a bus.

The memory 302 may include non-volatile storage media and internal memory.

Non-volatile storage media can store operating systems and computer programs. The computer program includes program commands. When the program commands are executed, the processor 301 may execute at least one operation of the 5G authentication method provided by the embodiment of the present application.

The processor 301 is configured to provide computing and control capabilities to support the operation of the entire electronic device 300.

The internal memory can provide an environment for running the computer program in the non-volatile storage medium. When the computer program is executed by the processor 301, the processor 301 can execute at least one operation of the 5G authentication method provided by the embodiment of the present application.

It should be understood that the processor 301 may be a central processing unit (Central Processing Unit, CPU), and the processor 301 may also be other general-purpose processors, digital signal processors (Digital Signal Processor, DSP), application specific integrated circuits (Application Specific Integrated Circuit, ASIC), Field-Programmable Gate Array (Field-Programmable Gate Array, FPGA) or other programmable logic devices, discrete gate or transistor logic devices, discrete hardware components, etc. A general-purpose processor may be a microprocessor, or the processor may be any conventional processor, or the like.

It can be understood that the structure shown in FIG. 6 is only a block diagram of a partial structure related to the solution of the present application, and does not constitute a limitation on the electronic device 300 to which the solution of the present application is applied. The specific electronic device 300 may include more or fewer components than those shown in the figures, or combine some components, or have different component arrangements.

In one possible implementation, the processor 301 is configured to run a computer program stored in the memory 302 to implement the following operations: based on authentication vector acquisition request transmitted by AUSF, determining whether there is authentication data in local; if there is no authentication data in local, acquiring an authentication vector from the HSS according to the authentication vector acquisition request; generating a home authentication vector according to the authentication vector, and transmitting the home authentication vector to the AUSF, to enable the AUSF perform authentication verification according to the home authentication vector.

In one possible implementation, the authentication vector acquisition request includes a terminal identifier; when acquiring the authentication vector from the HSS according to the authentication vector acquisition request, the processor 301 is configured to: acquire the authentication vector corresponding to the terminal identifier from the HSS according to the terminal identifier.

In one possible implementation, when generating the home authentication vector according to the authentication vector, the processor 301 is configured to: calculate the authentication vector according to a preset authentication algorithm to obtain the home authentication vector.

In one possible implementation, the processor 301 is further configured to: when the AUSF fails to perform authentication verification according to the home authentication vector, receive a resynchronization request transmitted by the AUSF to perform resynchronization.

In one possible implementation, when performing resynchronization by receiving the resynchronization request transmitted by the AUSF, the processor 301 is configured to: determine whether there is authentication data in local based on the resynchronization request transmitted by the AUSF; If there is no authentication data in local, acquire an authentication vector from the HSS according to the resynchronization request; generate a home authentication vector according to the authentication vector, and send the home authentication vector to the AUSF, so that the AUSF performs authentication verification according to the home authentication vector.

Figure 7:
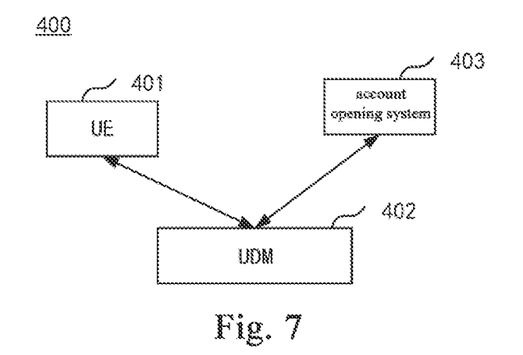
FIG. 7 is a schematic structural diagram of an 5G account opening system provided by an embodiment of the present application.

FIG. 7 is a schematic structural diagram of the 5G account opening system provided by an embodiment of the present application. The 5G account opening system 400 includes a UE 401, a UDM 402 and an account opening system 403; the UE 401, the UDM 402 and the account opening system 403 are connected in communication.

The UE 401 is configured to send a registration request after booting up.

The UDM 402 is configured to execute any 5G account opening method based on the registration request transmitted by the UE 401.

The account opening system 403 is configured to perform data migration and 5G account opening of the UE 401 according to the account opening command transmitted by the UDM 402.

The UDM 402 includes a processor and a memory, the memory is configured to store a computer program, and the processor is configured to execute at least one operation of the 5G account opening method provided in the embodiment of the present application.

It can be understood that the structure shown in FIG. 7 is only a block diagram of a partial structure related to the solution of the present application, and does not constitute a limitation on the 5G account opening system 400 to which the solution of the present application is applied. The specific 5G account opening system 400 can include more or fewer components than those shown in the figures, or combine some components, or have a different arrangement of components.

In one possible implementation, the processor is configured to run a computer program stored in the memory to implement the following operations: based on the registration request transmitted by the UE 401, performing authentication verification on the UE 401 according to the abovementioned 5G authentication method; When the authentication verification is successful, an account opening command is sent to the account opening system 403 so that the account opening system 403 performs data migration and 5G registration account opening of the UE 401 based on the account opening command.

In one possible implementation, when executing transmitting an account opening command to the account opening system 403 to enable the account opening system 403 to perform data migration and 5G registration account opening of the UE 401 based on the registration information, the processor is configured to: based on the data acquisition request transmitted by the AMF, determine whether there is subscription data of UE 401 in local; if there is no subscription data of the UE 401 in local, send an account opening command to the account opening system 403 so that the account opening system 403 performs data migration and 5G registration account opening of the UE 401 based on the account opening command.

The embodiment of the present application also provides a computer-readable storage medium. The computer-readable storage medium stores a computer program, the computer program includes program commands, and the processor executes the program commands to implement at least one operation of the 5G authentication method or the 5G account opening method provided in the embodiment of the present application.

The computer-readable storage medium may be the internal storage unit of the electronic device in the foregoing embodiments, for example, the hard disk or memory of the electronic device. The computer-readable storage medium can also be an external storage device of the electronic device, for example, a plug-in hard disk equipped on the electronic device, a smart memory card (Smart Media Card, SMC), a secure digital (Secure Digital, SD) card, a flash memory card (Flash Card) etc.

The above is only a specific embodiment of the present application, but the protection scope of the present application is not limited thereto. Any person familiar with the technical field can easily think of various equivalents modifications or replacements within the scope of the technology disclosed in the present application, these modifications or replacements shall be covered within the protection scope of the present application. Therefore, the protection scope of the present application should be based on the protection scope of the claims.

We claim:

1. A 5th Generation (5G) authentication method, comprising:
    determining whether there is authentication data related to 5G authentication in a local network based on a terminal identifier comprised in an authentication vector acquisition request transmitted by an authentication network element (AUSF);
    in response to there being no authentication data in the local network, acquiring an authentication vector from a home subscription server (HSS) according to the authentication vector acquisition request; and
    generating a home authentication vector according to the authentication vector, and transmitting the home authentication vector to the AUSF, to enable the AUSF to perform authentication verification according to the home authentication vector.

2. The 5G authentication method according to claim 1, wherein
    acquiring the authentication vector from the HSS according to the authentication vector acquisition request comprises: acquiring the authentication vector corresponding to the terminal identifier from the HSS according to the terminal identifier.

3. The 5G authentication method according to claim 1, wherein generating the home authentication vector according to the authentication vector comprises:
    calculating the authentication vector according to a preset authentication algorithm to obtain the home authentication vector.

4. The 5G authentication method according to claim 1, comprising:
    in response to the AUSF failing to perform the authentication verification according to the home authentication vector, receiving a resynchronization request transmitted by the AUSF to perform resynchronization.

5. The 5G authentication method according to claim 4, wherein receiving the resynchronization request transmitted by the AUSF to perform resynchronization comprises:
    determining whether there is authentication data in the local network based on the resynchronization request transmitted by the AUSF;
    in response to there being no authentication data in the local network, acquiring the authentication vector from the HSS according to the resynchronization request; and
    generating the home authentication vector according to the authentication vector, and transmitting the home authentication vector to the AUSF, to enable the AUSF to perform the authentication verification according to the home authentication vector.

6. A 5th Generation (5G) account opening method, comprising:
    performing authentication verification on a terminal according to the 5G authentication method according to claim 1, based on a registration request transmitted by the terminal; and
    in response to the authentication verification being successful, transmitting an account opening command to an account opening system, to enable the account opening system to perform data migration and 5G registration account opening of the terminal based on the account opening command.

7. The 5G account opening method according to claim 6, wherein transmitting an account opening command to the account opening system to enable the account opening system to perform data migration and 5G registration account opening of the terminal based on the account opening command comprises:
    determining whether there is subscription data of the terminal in the local network, based on a data acquisition request transmitted by an access and mobility management function (AMF); and
    in response to there being no the subscription data of the terminal in the local network, transmitting an account opening command to the account opening system to enable the account opening system to perform data migration and 5G registration account opening of the terminal based on the account opening command.

8. An electronic device comprising a memory and at least one processor; wherein:
    the memory is configured to store a computer program; and
    the at least one processor is configured to execute the computer program and configured to, when executing the computer program, determine whether there is authentication data related to 5G authentication in a local network based on a terminal identifier comprised in an authentication vector acquisition request transmitted by an authentication network element (AUSF);

in response to there being no authentication data in the local network, acquire an authentication vector from a home subscription server (HSS) according to the authentication vector acquisition request; and generate a home authentication vector according to the authentication vector, and transmit the home authentication vector to the AUSF, to enable the AUSF to perform authentication verification according to the home authentication vector.

9. A 5th Generation (5G) account opening system, comprising a terminal, a unified data management (UDM), and an account opening system, wherein:

the terminal is configured to transmit a registration request;

the UDM is configured to receive the registration request transmitted by the terminal and configured to: determine whether there is authentication data related to 5G authentication in a local network based on a terminal identifier comprised in an authentication vector acquisition request transmitted by an authentication network element (AUSF); in response to there being no authentication data in the local network, acquire an authentication vector from a home subscription server (HSS) according to the authentication vector acquisition request; and generate a home authentication vector according to the authentication vector, and transmit the home authentication vector to the AUSF, to enable the AUSF to perform authentication verification according to the home authentication vector; and the account opening system is configured to perform data migration and 5G registration account opening of the terminal according to an account opening command transmitted by the UDM.

10. A non-transitory computer-readable storage medium, on which a computer program is stored, and when the computer program is executed by a processor, cause the processor to implement:

determining whether there is authentication data related to 5G authentication in a local network based on a terminal identifier comprised in an authentication vector acquisition request transmitted by an authentication network element (AUSF);

in response to there being no authentication data in the local network, acquiring an authentication vector from a home subscription server (HSS) according to the authentication vector acquisition request; and generating a home authentication vector according to the authentication vector, and transmitting the home authentication vector to the AUSF, to enable the AUSF to perform authentication verification according to the home authentication vector.

11. A non-transitory computer-readable storage medium, on which a computer program is stored, and when the computer program is executed by a processor, cause the processor to implement:

performing authentication verification on a terminal according to a 5G authentication method, based on a registration request transmitted by the terminal, wherein the 5G authentication method comprises:

determining whether there is authentication data related to 5G authentication in a local network based on a terminal identifier comprised in an authentication vector acquisition request transmitted by an authentication network element (AUSF); in response to there being no authentication data in the local network, acquiring an authentication vector from a home subscription server (HSS) according to the authentication vector acquisition request; and generating a home authentication vector according to the authentication vector, and transmitting the home authentication vector to the AUSF, to enable the AUSF to perform the authentication verification according to the home authentication vector; and in response to the authentication verification being successful, transmitting an account opening command to an account opening system, to enable the account opening system to perform data migration and 5G registration account opening of the terminal based on the account opening command.

12. The 5G account opening method according to claim 6, wherein the authentication vector acquisition request comprises a terminal identifier; and acquiring the authentication vector from the HSS according to the authentication vector acquisition request comprises: acquiring the authentication vector corresponding to the terminal identifier from the HSS according to the terminal identifier.

13. The 5G account opening method according to claim 6, wherein generating the home authentication vector according to the authentication vector comprises:

calculating the authentication vector according to a preset authentication algorithm to obtain the home authentication vector.

14. The 5G account opening method according to claim 6, comprising:

in response to the AUSF failing to perform the authentication verification according to the home authentication vector, receiving a resynchronization request transmitted by the AUSF to perform resynchronization.

15. The 5G account opening method according to claim 14, wherein receiving the resynchronization request transmitted by the AUSF to perform resynchronization comprises:

determining whether there is authentication data in the local network based on the resynchronization request transmitted by the AUSF;

in response to there being no authentication data in the local network, acquiring the authentication vector from the HSS according to the resynchronization request; and generating the home authentication vector according to the authentication vector, and transmitting the home authentication vector to the AUSF, to enable the AUSF to perform the authentication verification according to the home authentication vector.

16. The electronic device according to claim 8, wherein the authentication vector acquisition request comprises a terminal identifier; and the processor is configured to acquire the authentication vector from the HSS according to the authentication vector acquisition request in the following manner: acquiring the authentication vector corresponding to the terminal identifier from the HSS according to the terminal identifier.

17. The electronic device according to claim 8, wherein the processor is configured to generate the home authentication vector according to the authentication vector in the following manner:

calculating the authentication vector according to a preset authentication algorithm to obtain the home authentication vector.

18. The electronic device according to claim 8, wherein the processor is further configured to:
   in response to the AUSF failing to perform the authentication verification according to the home authentication vector, receive a resynchronization request transmitted by the AUSF to perform resynchronization.

19. The electronic device according to claim 18, wherein the processor is configured to receive the resynchronization request transmitted by the AUSF to perform resynchronization in the following manner:
   determining whether there is authentication data in the local network based on the resynchronization request transmitted by the AUSF;
   in response to there being no authentication data in the local network, acquiring the authentication vector from the HSS according to the resynchronization request; and
   generating the home authentication vector according to the authentication vector, and transmitting the home authentication vector to the AUSF, to enable the AUSF to perform the authentication verification according to the home authentication vector.

20. The 5G account opening system according to claim 9, wherein the UDM is configured to transmit an account opening command to the account opening system to enable the account opening system to perform data migration and 5G registration account opening of the terminal based on the account opening command in the following manner:
   determining whether there is subscription data of the terminal in the local network, based on a data acquisition request transmitted by an access and mobility management function (AMF); and
   in response to there being no the subscription data of the terminal in the local network, transmitting an account opening command to the account opening system to enable the account opening system to perform data migration and 5G registration account opening of the terminal based on the account opening command.

* * * * *